(12) United States Patent
Bryer et al.

(10) Patent No.: US 9,937,781 B1
(45) Date of Patent: Apr. 10, 2018

(54) BATTERY PACK MOUNTING ARCHITECTURE WITH SHEAR PLATE FOR ELECTRIC DRIVE MOTOR VEHICLES

(71) Applicant: GM GLOBAL TECHNOLOGY OPERATIONS LLC, Detroit, MI (US)

(72) Inventors: Giles D. Bryer, Northville, MI (US); Frank Haubold, Royal Oak, MI (US); Amit Kumar, Washington Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 15/383,139

(22) Filed: Dec. 19, 2016

(51) Int. Cl.
| | |
|---|---|
| B60K 1/04 | (2006.01) |
| B62D 21/11 | (2006.01) |
| B62D 35/02 | (2006.01) |
| B62D 21/15 | (2006.01) |
| B62D 21/02 | (2006.01) |
| B62D 21/09 | (2006.01) |
| B62D 27/02 | (2006.01) |

(52) U.S. Cl.
CPC ............... *B60K 1/04* (2013.01); *B62D 21/02* (2013.01); *B62D 21/09* (2013.01); *B62D 21/11* (2013.01); *B62D 21/155* (2013.01); *B62D 27/02* (2013.01); *B62D 35/02* (2013.01); *B60K 2001/0438* (2013.01); *B60K 2001/0472* (2013.01); *B60Y 2200/91* (2013.01); *B60Y 2304/03* (2013.01); *B60Y 2306/09* (2013.01); *B60Y 2400/112* (2013.01)

(58) Field of Classification Search
CPC ........ B60K 1/04; B60D 25/20; B60D 21/157; B60D 21/152; B60D 21/155
See application file for complete search history.

(56) References Cited

U.S. PATENT DOCUMENTS

| | | | |
|---|---|---|---|
| 4,109,064 | A | 8/1978 | Warner et al. |
| 5,378,555 | A | 1/1995 | Waters et al. |
| 5,736,272 | A | 4/1998 | Veenstra et al. |
| 6,227,322 | B1 * | 5/2001 | Nishikawa ............. B60R 16/04 180/65.1 |
| 7,654,352 | B2 * | 2/2010 | Takasaki ................. B60K 1/04 180/65.1 |
| 7,836,989 | B2 | 11/2010 | Reed et al. |
| 7,913,788 | B1 | 3/2011 | Bryer et al. |

(Continued)

*Primary Examiner* — Hau V Phan
(74) *Attorney, Agent, or Firm* — Quinn IP Law

(57) ABSTRACT

Disclosed are shear plates for structurally connecting vehicle chassis front cradles to battery pack support trays, methods for making and methods for using such shear plates, and electric vehicles with a chassis frame having a front cradle coupled to a battery pack support tray by a shear plate. A shear plate is disclosed for connecting a front cradle to a traction battery pack. The shear plate includes an elongated plate body with opposing fore and aft braces connected by opposing starboard and port braces. The fore brace directly mechanically couples to a cross member of the front cradle, whereas the aft brace directly mechanically couples to a support tray of the traction battery pack. The shear plate's elongated body is designed to transmit in-plane and torsional forces received from the front cradle via the fore brace, through the starboard and port braces, to the support tray via the aft brace.

13 Claims, 2 Drawing Sheets

(56) References Cited

U.S. PATENT DOCUMENTS

| | | | |
|---|---|---|---|
| 8,403,090 B2* | 3/2013 | Fujiwara | H01M 2/1077 180/68.5 |
| 8,646,792 B2* | 2/2014 | Young | B62D 21/155 280/124.109 |
| 8,696,051 B2* | 4/2014 | Charbonneau | B62D 21/157 296/187.12 |
| 8,733,487 B2* | 5/2014 | Usami | B60K 1/04 180/68.5 |
| 8,739,910 B2* | 6/2014 | Katayama | B62D 21/152 180/311 |
| 8,814,255 B2* | 8/2014 | Yamaji | B62D 25/20 296/193.07 |
| 8,911,892 B2 | 12/2014 | Lent et al. | |
| 8,936,126 B2* | 1/2015 | Nitawaki | B60K 1/04 180/68.5 |
| 8,950,536 B2 | 2/2015 | Maguire et al. | |
| 9,022,152 B2* | 5/2015 | Imamura | B62D 21/157 180/68.5 |
| 9,236,592 B2 | 1/2016 | Sundararajan et al. | |
| 2009/0226806 A1* | 9/2009 | Kiya | B60K 1/04 429/186 |
| 2011/0104558 A1 | 5/2011 | Quinn et al. | |
| 2012/0021301 A1* | 1/2012 | Ohashi | B60K 1/04 429/400 |
| 2013/0020139 A1 | 1/2013 | Kim et al. | |
| 2013/0248267 A1* | 9/2013 | Nitawaki | B60K 1/04 180/68.5 |

* cited by examiner

BATTERY PACK MOUNTING ARCHITECTURE WITH SHEAR PLATE FOR ELECTRIC DRIVE MOTOR VEHICLES

The present disclosure relates generally to electric drive vehicles, including full electric and hybrid electric configurations. More specifically, aspects of this disclosure relate to mounting architectures for battery packs of battery electric vehicles (BEV).

Current production motor vehicles, such as the modern-day automobile, are originally equipped with a powertrain that operates to propel the vehicle and power the onboard vehicle electronics. The vehicle powertrain, which is inclusive of, and oftentimes misclassified as, a drivetrain system, is generally comprised of a prime mover that delivers driving power to the vehicle's final drive system (e.g., rear differential, axle, and wheels) through a multi-speed power transmission. Automobiles have normally been propelled by a reciprocating-piston type internal combustion engine because of its ready availability and relatively inexpensive cost, light weight, and overall efficiency. Such engines include two and four-stroke compression-ignited (CI) diesel engines, four-stroke spark-ignited (SI) gasoline engines, six-stroke architectures, and rotary engines, as some non-limiting examples.

Hybrid vehicles, on the other hand, utilize multiple traction power sources, such as an ICE assembly and a battery powered electric motor, to propel the vehicle. In so doing, hybrid vehicles minimize reliance on the engine for power and, thus, increase overall fuel economy. A hybrid electric vehicle (HEV), for example, incorporates both electric energy and chemical energy, and converts the same into mechanical power to propel the vehicle and power the vehicle's assorted systems. The HEV generally employs one or more electric machines (E-machine), such as electric motor/generators, that operate individually or in concert with an internal combustion engine to propel the vehicle. Since hybrid vehicles may derive their power from sources other than the engine, engines in hybrid vehicles may be turned off, in whole or in part, while the vehicle is propelled by the alternative power source(s).

Series hybrid architectures—sometimes referred to as Range-Extended Electric Vehicles (REEVs)—are generally typified by an internal combustion engine drivingly coupled to an electric generator. The electric generator, in turn, provides power to one or more tractive electric motors that operate to rotate the final drive members. In effect, there is no driving mechanical connection between the engine and the final drive members in a series hybrid powertrain. Eliminating a mechanical link between the engine and wheels allows the engine to be run at a constant and efficient rate, e.g., closer to the theoretical limit of 37%, rather than the normal average of 20%, even as vehicle speed changes. The electric motor/generator may also operate in a motoring mode to provide a starting function to the internal combustion engine. This system may also operate the electric motor(s) to recover energy from slowing the vehicle and store the energy in an electric vehicle battery (EVB) through "regenerative braking."

Parallel hybrid architectures, the most prevalent design in modern use, employ an internal combustion engine and an electric motor, each of which has a driving mechanical coupling to the power transmission and, thus, the final drive. Most parallel hybrid designs combine a large electric generator and a motor into one unit, providing tractive power and replacing both the conventional starter motor and the alternator. One such parallel hybrid powertrain architecture comprises a multi-mode, compound-split, electro-mechanical transmission which utilizes an input member for receiving power from the ICE, and an output member for delivering power from the transmission to the driveshaft. A pair of motor/generators operate individually or in concert to rotate the transmission's output shaft. These motor/generators are electrically connected to an energy storage device, such as a battery pack, for interchanging electrical power between the storage device and motor/generators. A powertrain system control unit is employed to regulate the electrical power exchange between the energy storage device and motor/generators, as well as the power interchange between the motor/generators.

Electrically variable transmissions (EVT) provide for continuously variable speed ratios by combining features from both series and parallel hybrid powertrain architectures. EVTs are operable with a direct mechanical path between the internal combustion engine and final drive, thus enabling relatively high transmission efficiency and the application of lower cost, less massive motor hardware. EVTs are also operable with engine operation that is mechanically independent from the final drive, in various mechanical/electrical split contributions, thereby enabling high-torque continuously-variable speed ratios, electrically dominated launches, regenerative braking, engine-off idling, and multi-mode operation. An EVT can achieve continuously variable torque and speed ratios between input and output without sending all power through the variable elements. The EVT can utilize differential gearing to send a fraction of its transmitted power through the motor/generator(s). The remainder of its power can be sent through another, parallel path that is mechanical and direct (i.e., "fixed ratio") or selectable.

A full electric vehicle (FEV)—colloquially known as "all-electric" vehicle—is an alternative type of electric drive vehicle configuration that altogether eliminates the internal combustion engine and attendant peripheral components from the powertrain system, relying solely on electric tractive motors for vehicle propulsion. Battery electric vehicles (BEV), for example, utilize energy stored within a rechargeable, onboard battery pack, rather than a fuel tank, fuel cell, or fly-wheel, to power these electric motors. The electric vehicle employs an electrical power distribution system for transmitting electrical energy back-and-for between the onboard battery pack and one or more electric motors via one or more motor controllers. Plug-in electric vehicle (PEV) variations allow the battery pack to be recharged from an external source of electricity, such as a public power grid via a residential or commercial electric vehicle charging station.

Automobile chassis frames are designed to support the vehicle components, body, and passengers during static loading, and to contribute toward vehicle stiffness and impact attenuation during dynamic loading. Many chassis frames have a ladder-like construction with a pair of opposing side rails or rocker panels connected via a series of transversely oriented cross members. Projecting forward from front ends of the rocker panels/side rails may be respective front rails connected via a front cross member, e.g., to cooperatively define a front cradle. In the same vein, projecting rearward from rear ends of the rocker panels/side rails may be respective rear rails connected via a rear cross member, e.g., to cooperatively define a rear subframe. For many hybrid vehicle configurations, the engine, electric motor, and front suspension is generally supported by the front cradle, whereas the fuel tank and rear suspension is generally supported by the rear subframe. Electric vehicles generally support the weight of the battery pack on a subjacent support tray, which is anchored to the chassis frame and packaged within a rear trunk compartment or underneath a rear passenger bench seat.

SUMMARY

Disclosed herein are shear plates for structurally connecting a front cradle of a vehicle chassis frame to a support tray of a traction battery pack, methods for making and methods for using such shear plates, and electric drive motor vehicles with a chassis frame having a front cradle mechanically coupled to a battery pack support tray by a shear plate. By way of example, and not limitation, there is presented a battery electric vehicle with a unique battery pack mounting architecture employing a shear plate that structurally connects a front suspension cradle to the rocker panels of the chassis frame and to the subjacent support tray of a traction battery pack. By connecting the cradle and battery pack with the shear plate, the strength and stiffness of the battery pack are exploited to meet vehicle-level performance requirements. As an example, the chassis frame and battery pack structure can be individually and concurrently tuned to meet vehicle impact performance requirements while helping to minimize gross vehicle mass. In this regard, the shear plate may be configured to distribute a barrier load into the lower structure of the pack. Optionally, the shear plate may be configured to transmit torsional loads from components of the suspension system to the lower pack structure. The shear plate may also act as an aerodynamic underbody panel and as a shield for protecting the traction battery pack.

Attendant benefits for at least some of the disclosed concepts include improved vehicle capacity to attenuate or disperse static and dynamic loads without undue deflection or distortion of the chassis frame by utilizing the traction battery pack as a vehicle structural member. Disclosed battery pack mounting architectures may also help to assuage vehicle noise, vibration, and harshness (NVH) while concomitantly reducing gross vehicle weight. During a front or rear vehicle impact event, the shear plate may be tunable to provide a predetermined amount of fore/aft load strength. At least some of the disclosed mounting architectures also help to improve packaging efficiency and underbody aerodynamic performance.

Aspects of the present disclosure are directed to underbody shear plates for structurally connecting select portions of a vehicle chassis frame to select portions of a traction battery pack of an HEV or FEV-type vehicle. Disclosed, for example, is a shear plate for a motor vehicle with a chassis frame and a traction battery pack. The chassis frame, which may take on any relevant configuration, such as ladder frames, unibody frames, perimeter frames, etc., includes a front cradle with one or more cradle rails connected to one or more cradle cross members. The traction battery pack, which is significantly larger, more powerful and higher in capacity than a starting, lighting, and ignition (SLI) battery, includes one or more electric battery modules mounted on a support tray. The shear plate includes, or may consist essentially of, an elongated plate body with opposing fore and aft braces connected by opposing starboard and port braces. The fore brace is configured to mechanically couple, e.g., via one or more threaded fasteners, to the cradle cross member of the front cradle. Conversely, the aft brace is configured to mechanically couple, e.g., via one or more threaded fasteners, to the support tray of the traction battery pack. The elongated plate body is configured to transmit load forces received from the front cradle, e.g., via the fore brace, through the starboard and port braces, to the support tray, e.g., via the aft brace. The shear plate's elongated body may further include one or more ribs disposed between and interconnecting the fore and aft braces. These ribs are tunable to attenuate or transmit the load forces in a predetermined manner. The elongated plate body, including the fore, aft, starboard and port braces, may be integrally formed as a single-piece unitary structure (e.g., machined as a stamped metal panel).

Other aspects of the present disclosure are directed to electric drive motor vehicles with improved battery pack mounting architectures. A "motor vehicle," as used herein, may include any relevant vehicle platform, such as passenger vehicles (hybrid, full electric, fuel cell hybrid, fully or partially autonomous, etc.), commercial vehicles, industrial vehicles, tracked vehicles, off-road and all-terrain vehicles (ATV), farm equipment, etc. In an example, an electric vehicle is presented that includes a chassis frame with opposing side rails (e.g., rocker panels) supporting at front ends thereof a front suspension cradle. The front suspension cradle includes a pair of laterally spaced cradle rails connected by a transversely oriented cradle cross member. A traction battery pack, which is anchored to the chassis frame, includes an array of electric battery modules mounted on a support tray. The electric vehicle also includes an electric traction motor that is mounted above the front cradle within a motor compartment. This motor is electrically connected to the traction battery pack, and operable to propel the vehicle by providing tractive power to the final drive system.

A shear plate is positioned along the underside of the vehicle body, e.g., subjacent the passenger compartment, interposed between the front cradle and the traction battery pack. This shear plate includes an elongated plate body with opposing, transversely oriented fore and aft braces that are connected by opposing, laterally spaced starboard and port braces. The starboard and port braces are mechanically coupled, e.g., via bolts, to the chassis frame. The fore brace is directly mechanically coupled e.g., via bolts, to the cradle cross member, while the aft brace is directly mechanically coupled e.g., via bolts, to the support tray. The shear plate's elongated body is designed to transmit in-plane and torsional load forces received from the front cradle via the fore brace, through the starboard and port braces, to the support tray via the aft brace.

Additional aspects of this disclosure are directed to methods of making and methods of using underbody shear plates for structurally connecting select portions of a vehicle chassis frame to select portions of a traction battery pack. For instance, a method is disclosed for manufacturing a shear plate for an electric vehicle with a chassis frame and a traction battery pack. The method includes, in any order and in any combination: receiving an elongated plate body; forming starboard and port braces on opposing starboard and port sides of the elongated plate body; and forming fore and aft braces on opposing fore and aft sides of the elongated plate body such that the fore and aft braces are connected by the starboard and port braces. The fore brace is formed to mechanically couple to a cradle cross member of a front cradle of a chassis frame, and the aft brace is formed to mechanically couple to a support tray of a traction battery pack. The plate body is formed to transmit fore-aft and suspension borne load forces received from the front cradle via the fore brace, through the starboard and port braces, to the support tray via the aft brace.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and representative modes for carrying out the present disclosure when taken in connection with the accompanying drawings and the appended claims. Moreover, this disclosure expressly includes any and all combinations and subcombinations of the elements and features presented above and below.

Figure 1:
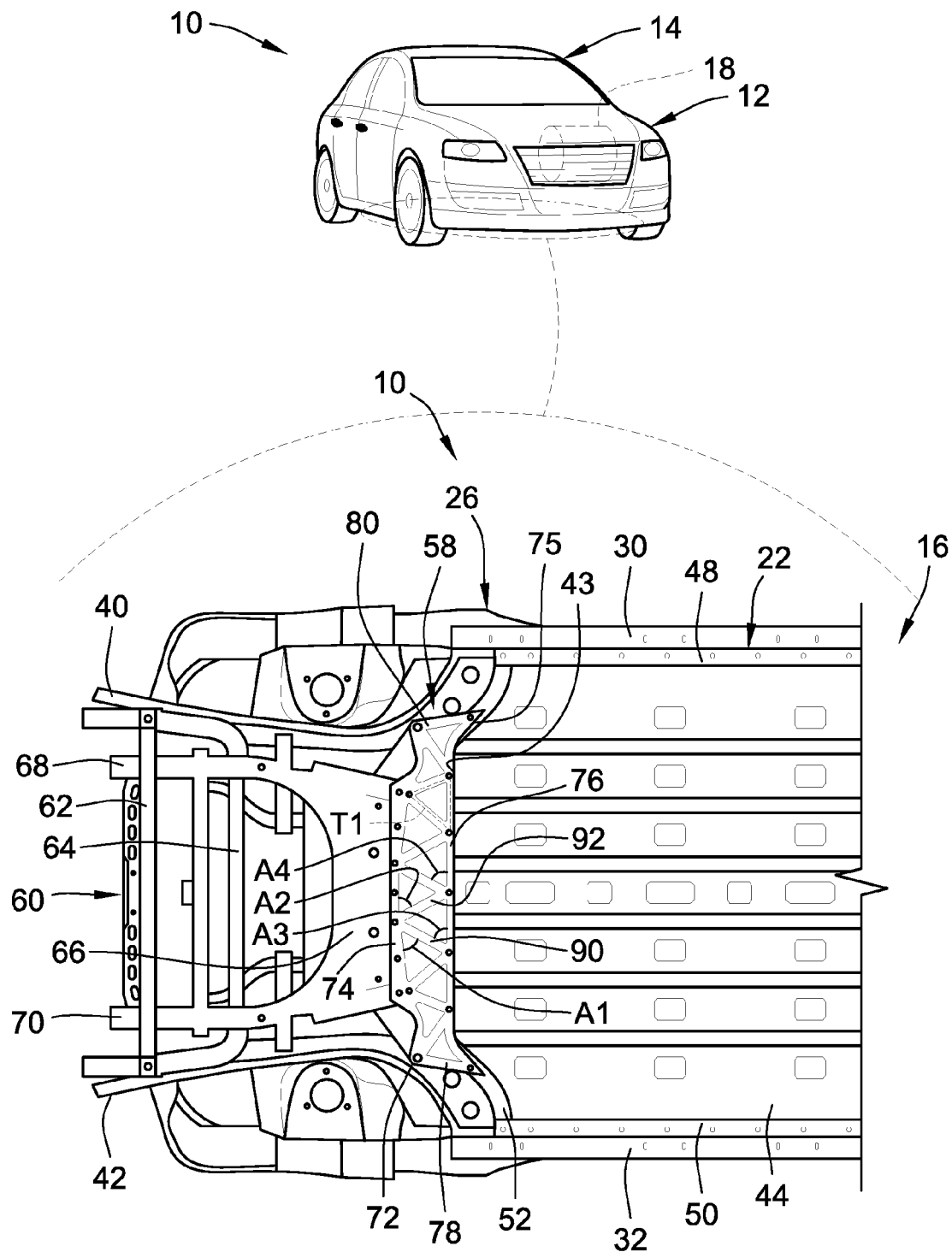
FIG. 1 is a front perspective-view illustration of a representative electric drive motor vehicle with an inset bottom view illustration of a traction battery pack mechanically coupled to a front suspension cradle of the chassis frame by a shear plate in accordance with aspects of the present disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure.

DETAILED DESCRIPTION

This disclosure is susceptible of embodiment in many different forms. There are shown in the drawings and will herein be described in detail representative embodiments of the disclosure with the understanding that these representative embodiments are to be considered an exemplification of the principles of the disclosure and are not intended to limit the broad aspects of the disclosure to the illustrated embodiments. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example. Lastly, directional adjectives, such as fore, aft, starboard, port, inboard, outboard, etc., may be with respect to a vehicle, such as a forward driving direction of an automobile, when said vehicle is operatively oriented on a normal driving surface.

Referring now to the drawings, wherein like reference numbers refer to like features throughout the several views, there is shown in FIG. 1 a perspective-view illustration of a representative automobile, which is designated generally at 10 and portrayed herein for purposes of discussion as a four-door sedan-style passenger vehicle. Mounted within the automobile 10 body, e.g., aft of a motor compartment 12 and underneath a passenger compartment 14, is a traction battery pack 16 that is electrically coupled to one or more electric motor-generators 18 that operate to propel the vehicle 10. The illustrated automobile 10—also referred to herein as "motor vehicle" or "vehicle" for short—is merely an exemplary application with which the novel aspects and features of this disclosure may be practiced. In the same vein, the implementation of the present concepts into an all-electric vehicle configuration should also be appreciated as an exemplary application of the novel concepts disclosed herein. As such, it will be understood that the aspects and features of the present disclosure may be applied to other battery pack configurations, may be incorporated into other electric drive vehicle powertrains, and may be implemented for any logically relevant type of motor vehicle. Lastly, the drawings presented herein are not necessarily to scale and are provided purely for instructional purposes. Thus, the specific and relative dimensions shown in the drawings are not to be construed as limiting.

Figure 2:
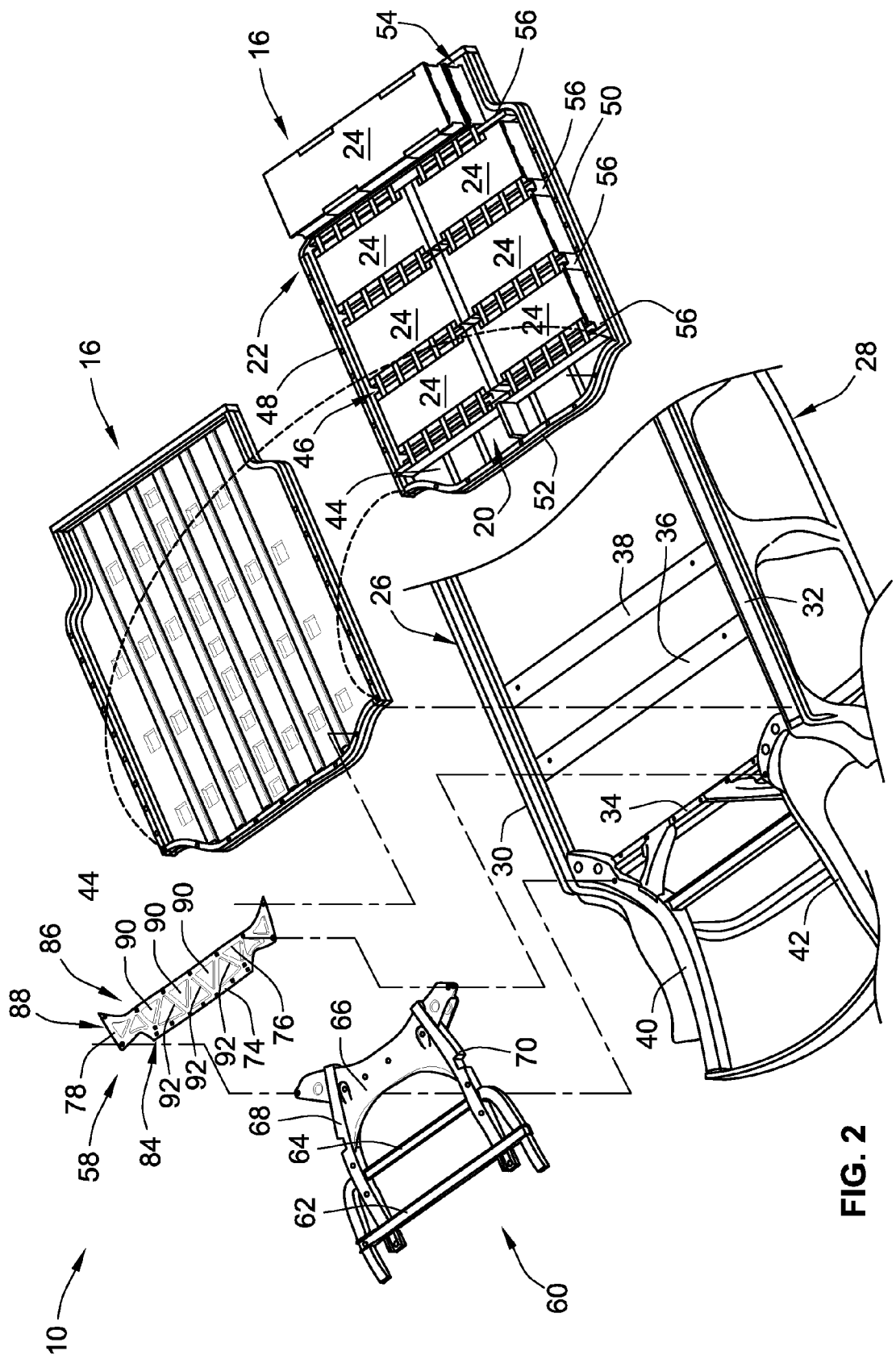
FIG. 2 is a partially exploded bottom perspective-view illustration of the traction battery pack (shown right-side up and inverted), front cradle, and shear plate being assembled and mounted to the chassis frame of FIG. 1.

As indicated above, FIG. 1 illustrates an electric drive vehicle 10 that may be a hybrid electric vehicle (HEV) or a battery electric vehicle (BEV), as some non-limiting examples. The vehicle 10 is constructed with an electric storage unit, which is portrayed in the drawings as a longitudinally mounted traction battery pack 16 with an array 20 of lead-acid, lithium-ion, or other applicable type of rechargeable electric vehicle batteries (EVB). In contrast to standard 12V lead-acid starting, lighting, and ignition (SLI) batteries, an electric vehicle traction battery pack 16 is designed to provide constant power over sustained periods of time, e.g., with a high ampere-hour capacity. The representative battery pack 16 is shown in FIG. 2 equipped with a battery support tray 22 that provides subjacent support for eight electric battery modules 24 arranged in a pattern of four rows of two battery modules 24 per row. Battery pack 16 may be composed of greater or fewer battery modules 24 that may be arranged in similar or alternative patterns from that which are shown in the drawings. Each of the illustrated battery modules 24 may include a series of pouch/prismatic battery cells, such as prismatic lithium ion (Li-ion) or Li-ion polymer battery cells and nickel-metal hydride (NiMH) battery cells, for example. For simplification of design and maintenance, and for reduction in cost, each module 24 may be approximately the same size or identical. A deformable nonconductive spacer, a cooling fluid channel, and/or peripheral control hardware (not shown) may be disposed between the battery cells if desired. In FIG. 2, a single traction battery pack 16 is shown both right-side up, e.g., to more clearly illustrate the battery modules 24, and upside down, e.g., to more clearly illustrate the orientation of the traction battery pack 16 when mounted to the chassis frame 26.

Vehicle 10 is originally equipped with a rigid floor pan (not visible) that extends across the top of the battery pack modules 24, e.g., to separate the battery pack 16 from the interior of the passenger compartment 14. The floor pan and battery pack 16, namely battery support tray 22, are anchored to a chassis frame 26 that supports, and may generally be unified with, at least a portion of a vehicle body 28. Chassis frame 26 is formed with a pair of longitudinally oriented, laterally spaced and generally parallel box-girder chassis side rails 30 and 32 (e.g., rocker panels). A series of transversely oriented U-shaped cross members (three of which are illustrated in FIG. 2 at 34, 36 and 38) are longitudinally spaced apart from one another and function to interconnect the chassis side rails 30, 32. Projecting from a front end of each chassis side rail 30, 32 is a respective forward side rail 40 and 42. In one example, a forward (first) cross member 38 spans between and is rigidly mounted to the forward side rails 40, 42, whereas intermediate (second and third) cross members 36, 38 span between and rigidly mount to chassis side rails 30, 32. For some applications, the intermediate cross members 36, 38 are provided with seat mounts (not shown) that functionally support thereon driver-side and passenger-side seat frames.

With reference to both FIGS. 1 and 2, the battery support tray 22 may include a bottom pan 44 that is sufficiently structurally resilient (e.g., stamped as a corrugated aluminum or steel panel) to support thereon and generally protect the components of the traction battery pack 16 from the road surface, weather, and external debris. This bottom pan 44 is rigidly secured, e.g., via rivets, welding or other joining technique, to a metal box-tube frame structure 46. According to the illustrated example, the frame structure 46 is composed of two laterally spaced, longitudinally oriented side tubes 48 and 50 that are interconnected by longitudinally spaced, transversely oriented forward and rearward tubes 52 and 54. Sequentially spaced along the length of the bottom pan 44 is a series of elongated cross beams 56, with each cross beam 56 spanning between and coupling to the side tubes 48, 50. It is within the scope of this disclosure for the box-tube frame structure 46 to include greater or fewer tubes with similar or differing shapes, sizes and orientations from those shown in the drawings. By way of non-limiting example, the frame structure 46 may be an assemblage of box-shaped, hat-shaped, I-shaped, U-shaped or solid cylindrical tubes, or any combination thereof, formed from any sufficiently resilient polymeric or metallic material, and fastened, welded, or integrally formed to any desired size and shape.

Mounted on a front end of vehicle chassis frame 26 is a front suspension cradle 60 (also referred to herein as "front cradle") that is used, for example, as a mounting structure for operatively connecting front vehicle suspension components, such as struts, coils springs, control arms, etc., to the powertrain-supporting segments of frame 26. It should be appreciated that the various novel aspects and features of this disclosure, while described with reference to a front cradle, can be similarly implemented for vehicle applications, such as a rear suspension cradle or other energy absorbing chassis structure. As shown in FIG. 2, front cradle 60 is fabricated with forward and central cradle cross rails 62 and 64, respectively, that are generally parallel to a transversely oriented rear cradle cross member 66. Forward and central cradle cross rails 62, 64 are connected to the rear cradle cross member 66 by a pair of front cradle rails 68 and 70 that are generally parallel to each other and with the chassis side rails 30, 32. The front cradle 60, like the chassis frame 26 and battery tray frame structure 46, may be comprised of various rail and cross members that are assembled into a unit or, alternatively, may be integrally formed into a single-piece structure, e.g., by casting, hydroforming or any applicable manufacturing process in the art. It should be appreciated that the front cradle 60 may be steel, aluminum, or any suitable material, wherein a cross-section of the material may be hollow or solid in nature.

Front suspension cradle 60 is mechanically attached to the traction battery pack 16 by a structural shear plate 58, which forms part of the vehicle's undercarriage. Acting as an aerodynamic underbody panel and as a shield for protecting part of the traction battery pack 16, for example, the shear plate 58 includes, or may consist essentially of, an elongated plate body 72 that is fastened to the underside of the chassis 26, with the major length of the body 72 oriented transversely with respect to the vehicle 10. The elongated plate body 72 is fabricated with opposing, transversely oriented fore and aft braces 74 and 76, respectively, that are connected by longitudinally oriented, laterally spaced starboard and port braces 78 and 80, respectively. For at least some configurations, the elongated plate body 72, including the fore and aft braces 74, 76, the starboard and port braces 78, 80, and ribs 90, 92, is integrally formed as a single-piece unitary structure. By way of example, and not limitation, the elongated plate body 72 is shown in FIGS. 1 and 2 as a stamped metal panel with the fore, aft, starboard and port braces 74, 76, 78, 80 contiguously formed as a continuous rim that extends around the outer perimeter of the shear plate 58. Alternatively, it is envisioned that the shear plate 58 comprise a select arrangement of individual brace segments and ribs that are structurally joined to form a unitary structure.

The fore (or forward-most) brace 74 of the structural shear plate 58 may be formed to mechanically couple directly to the cradle cross member 66 of the front cradle 60, whereas the aft (or rearward-most) brace 76 may be formed to mechanically couple directly to the battery support tray 22 of the traction battery pack 16. In the same vein, the starboard (or right-most) brace 78 of the structural shear plate 58 may be formed to mechanically couple to the (right-hand side) forward side rail 42 of the chassis frame 26. Likewise, the port (or left-most) brace 80 may be formed to mechanically couple to the (left-hand side) forward side rail 40 of the chassis frame 26, as illustrated in the inset view of FIG. 1. According to the representative configuration shown in the drawings, each brace segment 74, 76, 78, 80 of the shear plate 58 includes a respective series of bolt holes (each series respectively designated 84, 86, 88 and 91 in FIG. 2) that receives therethrough bolts or other mechanical fasteners to thereby directly mount the elongated plate body 72 to the front suspension cradle 60, the traction battery pack 16, and the vehicle chassis frame 26. Once the structural shear plate 58 is properly mounted, a rearward-facing edge 75 of the aft brace 76 is contoured to sit flush against a complementary forward-facing edge 43 of the support tray 22 bottom pan 44, as seen in FIG. 1. At the same time, an interface surface of the elongated plate body 72—e.g., an (upper-most surface of the contiguously formed fore, aft, starboard and port braces 74, 76, 78, 80—abuts and lays flush against a (bottom-most) cradle surface of the cradle cross member 66 and a (bottom-most) frame surface of forward tube 52.

By structurally interconnecting the front suspension cradle 60 and battery pack 16 with the shear plate 58, the strength and stiffness of the battery pack's battery support tray 22 may be exploited to meet vehicle-level performance requirements. For instance, the elongated plate body 72 is shaped, contoured, and positioned to receive for/aft in-plane loads and/or suspension-generated torsional forces from the front cradle 60 via the fore brace 74, pass these loads through the braces 78, 80 and ribs 90, 92, and transmit these loads to the battery support tray 22 via the aft brace 76. To provide tunable energy dissipating and transmitting characteristics, the elongated plate body 72 may be formed with one or more ribs (ten of which are shown in the drawings, some of which are designated at 90 and 92). These ribs 90, 92, which are disposed between and may be positioned in-plane with the starboard and port braces 78, 80, interconnect the fore and aft braces 74, 76 to transmit loads therebetween. As shown in FIG. 1, each rib 90, 92 may extend from the fore and aft braces 74, 76 at oblique angles. For instance, a first rib 90 (or first set of ribs) extends from the fore brace 74 at a first oblique angle A1 (e.g., about 50 degrees), whereas a second rib 92 (or second set of ribs) extends from the fore brace 74 at a second oblique angle A2 (e.g., about 60 degrees) that is distinct from the first oblique angle A1. In this regard, the first rib 90 (or first set of ribs) extends from the aft brace 76 at third oblique angle A3 (e.g., about 60 degrees), whereas the second rib 92 (or second set of ribs) extends from the aft brace 76 at a fourth oblique angles A4 (e.g., about 70 degrees) that is distinct from the third oblique angle A3.

In addition to, or as an alternative option from, arranging each of the ribs 90, 92 to project from the fore and aft braces 74, 76 at distinct oblique angles, the ribs can be cooperatively arranged in predetermined patterns so as to provide a desired manner of load transmission and/or attenuation. In accord with the illustrated example, the ribs 90, 92 can be arranged into pairs of angled ribs, wherein each pair is interconnected with the fore and/or aft brace to cooperatively define a triangular plan-view construction T1, as best seen with reference to the inset view of FIG. 1. These pairs of angled ribs can be arranged such that every pair shares a substantially identical triangular plan-view construction. Alternatively, the angled ribs can be arranged such that each pair of angled ribs has (or a set of pairs have) a triangular plan-view construction that is distinct from another pair (or set of pairs) of angled ribs. For instance, the pairs of angled ribs may include a first pair of angled ribs that define a first triangular plan-view construction, and a second pair of angled ribs that define a second triangular plan-view construction that is distinct from the first triangular plan-view construction.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed is:

1. A shear plate for an electric vehicle with a chassis frame and a traction battery pack, the chassis frame including a front cradle with a cradle rail connected to a cradle cross member, and the traction battery pack including an electric battery module mounted on a support tray, the shear plate comprising:
   an elongated plate body with opposing fore and aft braces connected by opposing starboard and port braces, the fore brace being configured to mechanically couple to the cradle cross member of the front cradle, and the aft brace being configured to mechanically couple to the support tray of the traction battery pack, the elongated plate body further including a plurality of ribs disposed between the starboard and port braces and connecting the fore and aft braces,
   wherein the elongated plate body is configured to transmit load forces received from the front cradle via the fore brace, through the starboard and port braces, to the support tray via the aft brace.

2. The shear plate of claim 1, wherein each of the ribs extends from the fore brace at an oblique angle.

3. The shear plate of claim 2, wherein the plurality of ribs includes a first rib extending from the fore brace at a first oblique angle and a second rib extending from the fore brace at a second oblique angle distinct from the first oblique angle.

4. The shear plate of claim 2, wherein the plurality of ribs includes a first rib extending from the fore and aft braces at first fore and aft oblique angles, respectively, and a second rib extending from the fore and aft braces at second fore and aft oblique angles, respectively, the second fore and aft oblique angles being respectively distinct from the first fore and aft oblique angles.

5. The shear plate of claim 1, wherein the plurality of ribs includes multiple pairs of angled ribs, wherein each of the pairs of angled ribs is interconnected with the fore brace to cooperatively define a triangular plan-view construction.

6. The shear plate of claim 5, wherein the pairs of angled ribs includes a first pair of angled ribs defining a first triangular plan-view construction and a second pair of angled ribs defining a second triangular plan-view construction distinct from the first triangular plan-view construction.

7. The shear plate of claim 1, wherein the elongated plate body further includes an interface surface configured to lay flush against a cradle surface of the cradle cross member and a frame surface of the support tray.

8. The shear plate of claim 1, wherein the aft brace includes a rearward-facing edge contoured to sit flush against a forward-facing edge of the support tray.

9. The shear plate of claim 1, wherein the fore brace includes a first series of bolt holes configured to receive therethrough fasteners to thereby directly mount the elongated plate body to the cradle cross member, and wherein the aft brace includes a second series of bolt holes configured to receive therethrough fasteners to thereby directly mount the elongated plate body to the support tray.

10. The shear plate of claim 1, wherein the starboard and port braces are configured to mechanically couple to forward side rails of the chassis frame.

11. The shear plate of claim 1, wherein the elongated plate body, including the fore and aft braces and the starboard and port braces, is integrally formed as a single-piece unitary structure.

12. The shear plate of claim 11, wherein the elongated plate body is a stamped metal panel with the fore, aft, starboard and port braces contiguously formed as a continuous rim.

13. An electric vehicle, comprising:
   a chassis frame with a front cradle having a pair of laterally spaced cradle rails connected by a transversely oriented cradle cross member;
   a traction battery pack anchored to the chassis frame and including a plurality of electric battery modules mounted on a support tray;
   an electric motor mounted above the front cradle and electrically connected to the traction battery pack; and
   a shear plate including an elongated plate body with opposing transversely oriented fore and aft braces connected by opposing laterally spaced starboard and port braces, the starboard and port braces being mechanically coupled to the chassis frame, the fore brace being directly mechanically coupled to the cradle cross member, and the aft brace being directly mechanically coupled to the support tray, the elongated plate body further including a plurality of ribs disposed between the starboard and port braces and connecting the fore and aft braces, wherein the elongated plate body is configured to transmit in-plane and torsional load forces received from the front cradle via the fore brace, through the ribs and the starboard and port braces, to the support tray via the aft brace.

* * * * *